(12) United States Patent  
Cardno et al.

(10) Patent No.: US 8,538,769 B2  
(45) Date of Patent: *Sep. 17, 2013

(54) CONTACT CENTER DATA VISUALIZATION SYSTEM AND METHOD

(75) Inventors: Andrew John Cardno, Wllington (NZ); Grant Frederick Margison, Wellington (NZ); Michael John Douglas Hornsby, Wellington (NZ)

(73) Assignee: Bally Gaming, Inc., Las Vegas, NV (US)

( * ) Notice: Subject to any disclaimer, the term of this patent is extended or adjusted under 35 U.S.C. 154(b) by 670 days.

This patent is subject to a terminal disclaimer.

(21) Appl. No.: 12/782,642

(22) Filed: May 18, 2010

(65) Prior Publication Data

US 2010/0268662 A1    Oct. 21, 2010

Related U.S. Application Data

(63) Continuation of application No. 12/197,204, filed on Aug. 22, 2008, now Pat. No. 7,747,743, which is a continuation of application No. 10/345,649, filed on Jan. 16, 2003, now Pat. No. 7,627,668, which is a continuation of application No. PCT/NZ01/00143, filed on Jul. 17, 2001.

(30) Foreign Application Priority Data

Jul. 17, 2000 (NZ) ....................................... 505784

(51) Int. Cl.
*G06Q 10/10* (2012.01)
*G06Q 30/02* (2012.01)
*G06Q 10/06* (2012.01)
*G06Q 30/06* (2012.01)
*G06Q 10/08* (2012.01)

(52) U.S. Cl.
USPC ........................................................ 705/1.1

(58) Field of Classification Search
None
See application file for complete search history.

(56) References Cited

U.S. PATENT DOCUMENTS 5,150,312 A * 9/1992 Beitel et al. ................... 345/418
5,214,281 A   5/1993 Rowe (Continued)

FOREIGN PATENT DOCUMENTS

| NZ | 505784 | 7/2000 |
| WO | WO00/77682 | 12/2000 |
| WO | WO02/07007 | 1/2002 |

OTHER PUBLICATIONS www.esri.com, retrieved from Internet Archive Wayback Machine <www.archive.org>, Date Range: Feb. 15, 1998-Jul. 5, 1998.*

*Primary Examiner* — Jonathan Ouellette (74) *Attorney, Agent, or Firm* — Brooke Quist; Marvin Hein (57) ABSTRACT

A data visualization system is disclosed that includes an interaction database, a retrieval component, a display component, and a contour generator. The interaction database is maintained in a computer memory of interaction data representing interactions between customers and at least one merchant. The retrieval component is configured to retrieve from the interaction database data representing interactions between customers and the merchant, and to construct a finite set of data values from the retrieved data. The display component is configured to display a graphical representation of a merchant and a graphical representation of each of the set of data values centered on respective data points disposed on a representation of a bell-shaped curve. The contour generator configured to generate and display one or more contour lines at least partly around each data point to form a bell-shaped curve, in which the areas of representation around each data point are shown in a series of contour lines, and the nature of the contour lines for each data point are preferably represented to gradually drop off or fan away from each data point, wherein each data point is displayed as a local maximum at an apex of the bell-shaped curve.

13 Claims, 11 Drawing Sheets

(56) References Cited

U.S. PATENT DOCUMENTS

| | | | |
|---|---|---|---|
| 5,526,476 | A | 6/1996 | Motokado et al. |
| 5,796,932 | A | 8/1998 | Fox et al. |
| 5,930,764 | A | 7/1999 | Melchione et al. |
| 6,067,502 | A | 5/2000 | Hayashida et al. |
| 6,211,887 | B1 | 4/2001 | Meier et al. |
| 6,232,984 | B1 | 5/2001 | Chuah et al. |
| 6,266,618 | B1 | 7/2001 | Ye et al. |
| 6,282,547 | B1 | 8/2001 | Hirsch |
| 6,466,211 | B1 | 10/2002 | Havre et al. |
| 6,470,383 | B1 | 10/2002 | Leshem et al. |
| 6,477,533 | B2 | 11/2002 | Schiff et al. |
| 6,529,197 | B1 | 3/2003 | Ballard et al. |
| 6,654,497 | B1 | 11/2003 | Kondo et al. |
| 7,627,668 | B2 | 12/2009 | Cardno et al. |
| 2001/0024497 | A1 | 9/2001 | Campbell et al. |
| 2001/0044751 | A1 | 11/2001 | Pugliese, III et al. |
| 2002/0016774 | A1 | 2/2002 | Pendlebury |
| 2002/0022977 | A1 | 2/2002 | Schiff et al. |
| 2003/0107571 | A1 | 6/2003 | Mulgan et al. |
| 2005/0078111 | A1 | 4/2005 | Cardno et al. |
| 2005/0192825 | A1 | 9/2005 | Cardno et al. |
| 2006/0178918 | A1 | 8/2006 | Mikurak |

\* cited by examiner

CONTACT CENTER DATA VISUALIZATION SYSTEM AND METHOD

CROSS-REFERENCE TO RELATED APPLICATIONS

This application is a continuation of U.S. application Ser. No. 12/197,204, filed on Aug. 22, 2008, which is a continuation of U.S. application Ser. No. 10/345,649, filed on January 16, 2003, now U.S. Pat. No. 7,627,668, issued on Dec. 1, 2009, which is a continuation of International Application No. PCT/NZ01/00143, filed on Jul. 17, 2001, which claims priority to New Zealand Application No. 505784, filed on Jul. 17, 2000, the contents of which are incorporated herein by reference in their entirety.

FIELD OF INVENTION

The invention relates to a data visualisation system and method, particularly but not solely designed for use in visualising contact centre data. Contact centres could include call centres, telemarketing organisations, and web-based customer service and marketing organisations.

BACKGROUND TO INVENTION

The low cost of data storage hardware has led to the collection of large volumes of data. Merchants, for example, generate and collect large volumes of data during the course of their business. To complete effectively, it is necessary for a merchant to be able to identify and use information hidden in the collected data. Where the merchant operates a call centre, this data could include operational parameters such as the average time a caller spends waiting and the geographic location from which each caller interacts with the merchant. The task of identifying this hidden information has proved very difficult for merchants.

Traditionally, analysis of data has been achieved by running a query on a set of data records stored in a database. The merchant or other party first creates a hypothesis, converts this hypothesis to a query, runs the query on the database, and interprets the results obtained with respect to the original hypothesis.

One disadvantage of this verification-driven hypothesis approach is that the merchant must form the desired hypothesis in advance. This is merely confirming what the merchant already suspects and does not provide the merchant with information which may be unexpected. Another disadvantage is that the merchant needs to have available the technical knowledge to formulate the appropriate queries.

SUMMARY OF INVENTION

In broad terms in one form the invention comprises a data visualisation system comprising a data value memory in which is maintained a finite set of data values, each data value associated with at least one time value; a display arranged to display a representation of each data value centred on respective data points; and a contour generator arranged to generate and display a contoured representation around each data point such that each data point is displayed as a local maximum.

In another preferred form, the invention comprises a data visualisation system comprising a data value memory in which is maintained a finite set of data values, each data value associated with at least one time value; a display arranged to display a representation of each data value centred on respective data points; and a contour generator arranged to generate and display one or more contour lines around each data point, each contour line representing data values which are less than the data value of the data point around which the contour line is displayed.

In a further preferred form, the invention comprises a data visualisation system comprising a data value memory in which is maintained an interaction database of interaction data representing interactions between customers and merchants, the interaction data associated with at least one time value; a retrieval device arranged to retrieve from the interaction database data representing interactions between customers and merchants and to construct a finite set of data values from the retrieved data; and a display arranged to display a graphical representation of at least one merchant and to superimpose one or more contoured representations of the data values on the graphical representation of the merchant such that each data value is displayed as a local maximum.

In yet a further preferred form, the invention comprises a method of data visualisation comprising the steps of maintaining in a data value memory a finite set of data values, each data value associated with at least one time, value; displaying a representation of each data value centred on respective data points; and generating and displaying a contoured representation around each data point such that each data point is displayed as a local maximum.

In yet another preferred form, the invention comprises a method of data visualisation comprising the steps of maintaining in a data value memory a finite set of data values, each data value associated with at least one time value; displaying a representation of each data value centred on respective data points; and generating and displaying one or more contour lines around each data point, each contour line representing data values which are less than the data value of the data point around which the contour line is displayed.

In a further preferred form, the invention comprises a method of data visualisation comprising the steps of maintaining in an interaction database interaction data representing interactions between customers and merchants, the interaction data associated with at least one time value; retrieving from the interaction database data representing interactions between customers and merchants; constructing a finite set of data values from the retrieved data; displaying a graphical representation of at least one merchant; and superimposing a contoured representation of the data values on the graphical representation of the merchant such that each data value is displayed as a local maximum.

In yet another preferred form, the invention comprises a data visualisation computer program comprising a finite set of data values maintained in a data value memory, each data value associated with at least one time value; a contour generator arranged to generate and display a contoured representation around a series of data points such that each data point is displayed as a local maximum.

In a further preferred form the invention comprises a data visualisation computer program comprising a finite set of data values maintained in a data value memory, each data value associated with at least one time value; a contour generator arranged to generate and display one or more contour lines around a series of data points, each contour line representing data values which are less than the data value of the data point around which the contour line is displayed.

In yet another preferred form the invention comprises a data visualisation computer program comprising an interaction database of interaction data maintained in a memory, the interaction data representing interactions between customers and merchants, the interaction data associated with at least one time value; a retrieval component operable to retrieve from the interaction database data representing interactions between customers and merchants and to construct a finite set of data values from the retrieved data; and a display component arranged to display a graphical representation of at least one merchant and to superimpose one or more contoured representations of the data values on the graphical representation of the merchant such that each data value is displayed as a local maximum.

BRIEF DESCRIPTION OF THE FIGURES

Preferred forms of the data visualisation system and method will now be described with reference to the accompanying figures in which.

DETAILED DESCRIPTION OF PREFERRED FORMS

Figure 1:
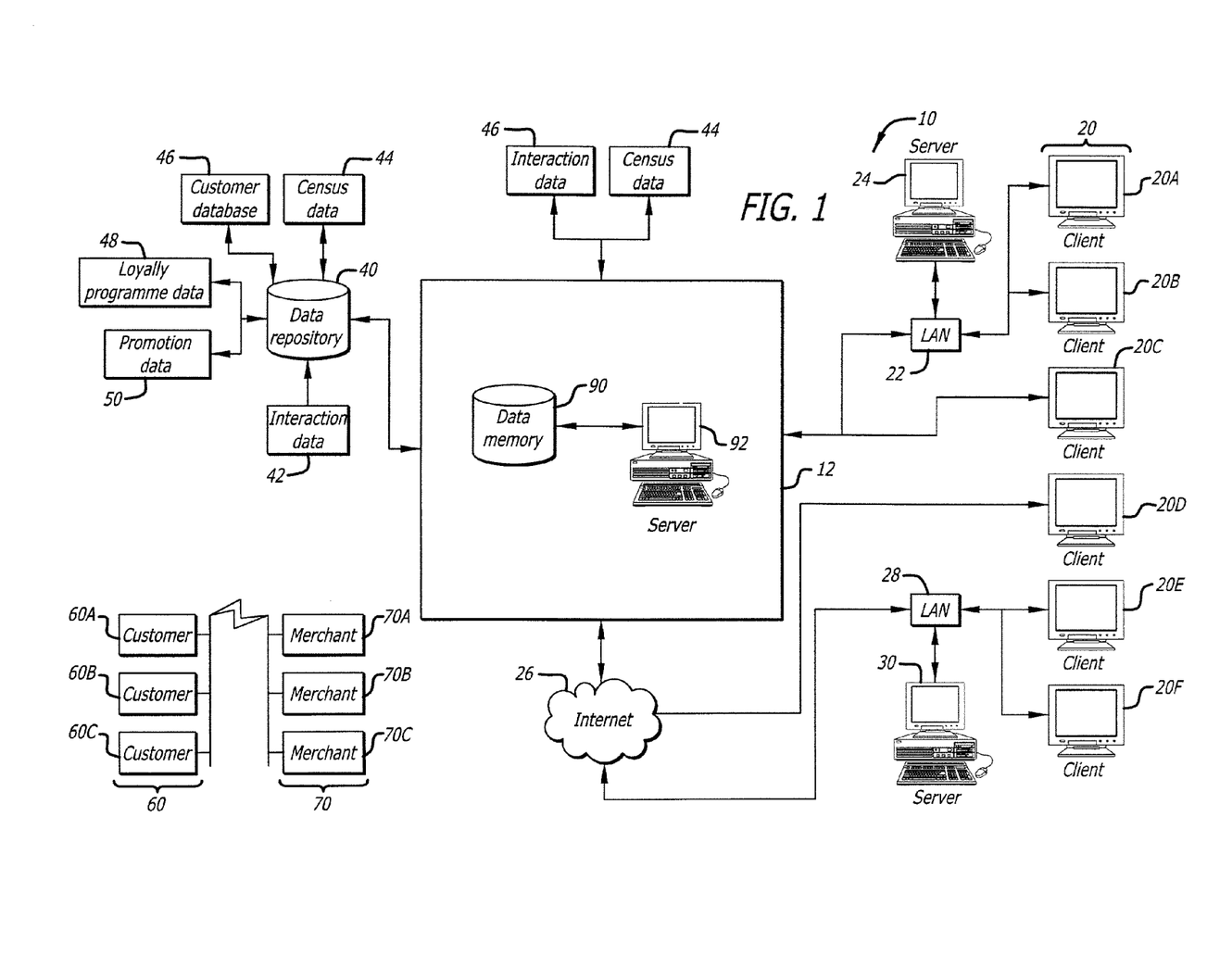
FIG. 1 shows a block diagram of a system in which one form of the invention may be implemented.

FIG. 1 illustrates a block diagram of the preferred system 10 in which one form of the present invention may be implemented. The system includes one or more clients 20, for example 20A, 20B, 20C, 20D, 20E and 20F, which each may comprise a personal computer or workstation described below. Each client 20 is interfaced to a workstation 12 as shown in FIG. 1. Each client 20 could be connected directly to a network 22, such as a local area network or LAN, or could be connected through the Internet.

Clients 20A and 20B, for example, are connected to a network 22, such as a local area network or LAN. The network 22 could be connected to a suitable network server 24 and communicate with the workstation as shown. Client 20C is shown connected directly to the workstation using for example a serial connection or WAP connection. Clients 20D, 20E and 20F are shown connected to the workstation through the Internet 26. Client 20D is shown as connected to the Internet 26 with a dial-up connection and clients 20E and 20F are shown connected to a network 28 such as a local area network or LAN, with the network 28 connected to a suitable network server 30.

The preferred system 10 further comprises a data repository 40, for example a data warehouse maintained in a memory. It is envisaged that the data repository may alternatively comprise a single database, a collection of databases, or a data mart. The preferred data repository 40 includes data from a variety of sources. The data repository may include, for example, interaction data 42 representing interactions between customers and merchants as will be more particularly described below. The data repository may also include data from other sources for example census data 44, data from merchant customer databases 46, data from merchant loyalty programmes 48 and/or promotion data 50 held by a merchant or other organisation.

In one form, the invention is arranged to display data representing interactions between customers and merchants. Typically, a merchant will operate a contact centre as part of its business. A contact centre could include a call centre in which customers contact a merchant over a telecommunications network and the interaction is handled by a customer service operator within the merchant organisation. Alternatively, a merchant may operate a call centre as its core business and could process calls for one or more third party merchants. The merchant may operate a call centre in one or more geographic locations.

It is also envisaged that a contact centre could include a telemarketing organisation in which one or more operators within a telemarketing organisation initiate contact with one or more customers or potential customers over a telecommunications network. The aim of the interaction would be to engage the customer or potential customer in a contract for goods or services of benefit to both parties. It is also envisaged that the merchant may operate a web-based customer service centre in which a merchant operates from one or more web sites which are accessed by customers over a computer network. The customers could transmit queries for the merchant by way of email, messages or interactive chat sessions. It is also envisaged that the merchant may operate a web-based marketing or advertising organisation in which one or more operators will initiate contact over a computer network with customers or potential customers, or alternatively the system could initiate contact automatically with a customer or potential customer providing a particular operator as the point of contact should the customer wish to contact the organisation. The invention will be described with reference to a call centre, although it is envisaged that the scope of the invention includes any form of contact centre.

Typically, each customer 60 for example customer 60A, 60B and 60C will contact one or more merchants 70 for example merchant 70A, 70B or 70C through a public-switched telephone network 80. As each customer interacts with a merchant, the interaction generates interaction data 42 which is then migrated to the data repository 40. The interaction data could be stored as a plurality of interaction data sets in the form of records in a relational database. Each record may include a merchant identifier used to identify a particular merchant, and where a merchant operates from more than one geographical location, the merchant identifier or some other identifier included in the record could identify the geographic location in which the interaction occurs or the geographic location from which the customer initiates the interaction.

Where a merchant organisation employs a plurality of operators, each operator could be identified by an operator identifier in the interaction data. Each interaction data set for example could include an operator identifier which, in the case of a call centre, could be the telecommunication or other network address within the organisation for that operator. It is envisaged that the operator identifier could include any other unique identifier for that operator, for example operator name. It is also envisaged that the operator identifier could include a network address where the merchant operates a web-based contact centre.

The record could also include a customer identifier and may have stored other data, for example residential address and family size of the customer. Further information could be stored in the customer database 46, in the loyalty programme database 48 and/or promotional database 50. Such data could be migrated to the data repository 40.

The record could also include data such as the date and/or time at which the interaction between the customer and the merchant took place. The date and/or time value is an example of a time value with which each interaction is associated. It is envisaged that the interaction record could include the time an interaction commenced and the time an interaction ended. The duration of each interaction could then be calculated from the difference in the two time values to enable various statistics to be displayed, as will be described below. The duration of the interaction could be stored in the interaction data set for ease of access, or could simply be calculated when needed.

It is also envisaged that the interaction data set could include a call type identifier. A call type identifier could distinguish an interaction intended for customer services from an interaction intended for other parts of an organisation, for example administration, repairs, marketing and so on.

The interaction data 42 is migrated to the data repository 40, generally by way of daily updates or in real time. It is advantageous to cleanse, catalogue and validate the interaction data during migration of the data to the data repository, and this task could be performed by either the merchant or by a third party. Once stored in the data repository 40, the data could be linked to other sources of data for subsequent retrieval, for example the census data 44, the customer database 46, data from a merchant loyalty programme 48 and/or promotion data 50 held by the merchant.

The data repository 40 could be maintained by a merchant or alternatively could be maintained by a third party. Updates to the data repository could be carried out by the merchant directly, or alternatively the merchant could provide batched data to a third party for updating the data. Alternatively, a third party could be entrusted with the task of collecting the interaction data and migrating the data to the data repository.

The personal computer or workstation 12 preferably operates under the control of appropriate operating and application software, and has a data memory 90 connected to a server 92. The invention includes a retrieval device or retrieval component 94 which in one form comprises a software-implemented query enabling retrieval of data from the data repository 40, and in another form comprises a memory on which the query is installed and operating. The data retrieved using the retrieval device 94 is processed with the server 92. A contour generator 96 which in one form comprises a computer-implemented software program generates a contoured representation or series of contour lines in order to display a representation of the data on a client workstation 20, as will be described below. A display component (not shown) could comprise a conventional display software module interfaced to the contour generator and operable to display data on a client 20. Preferred forms of the contour generator computer program 96 are also described below.

Figure 2:
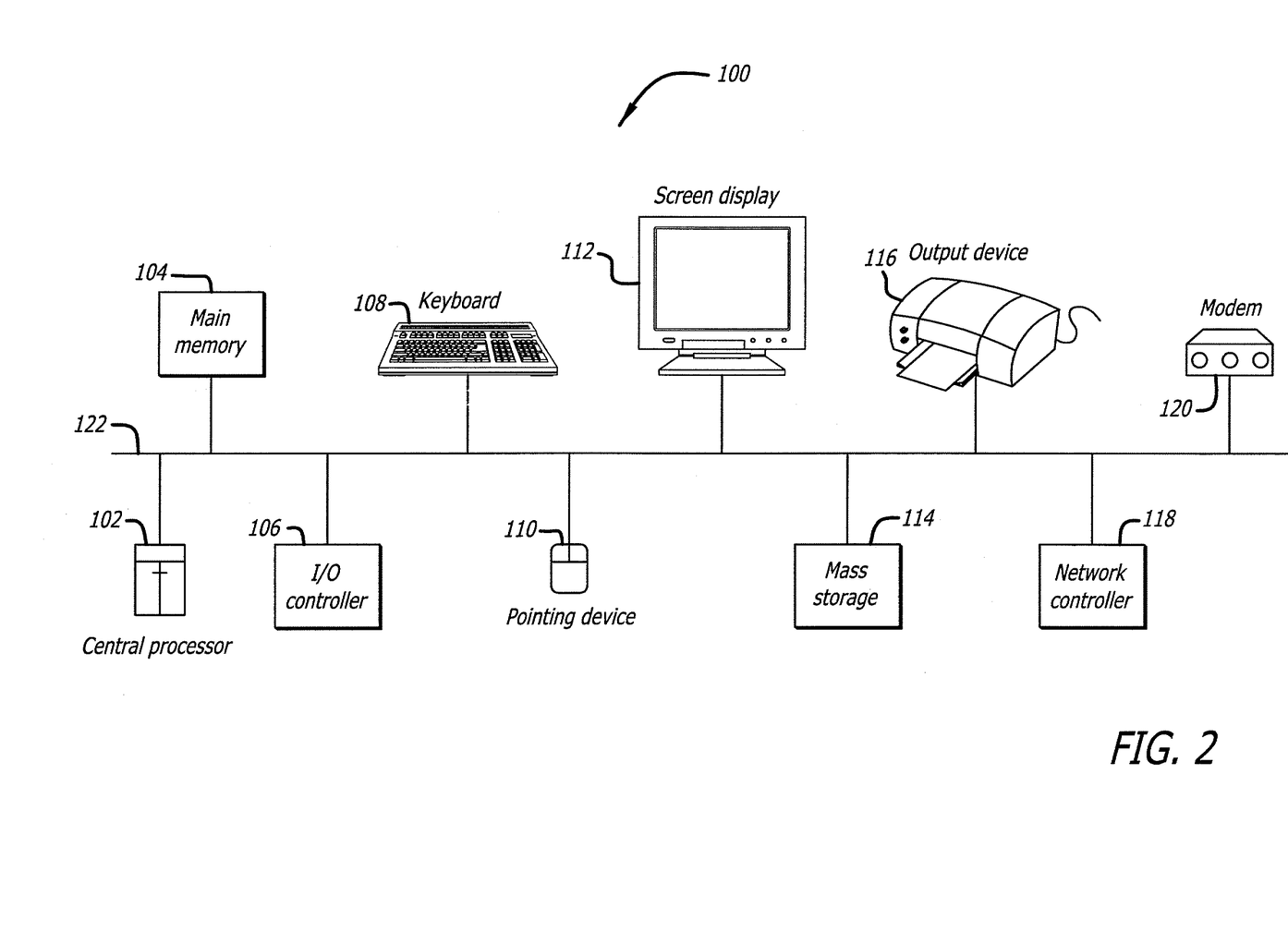
FIG. 2 shows the preferred system architecture of hardware on which the present invention may be implemented.

FIG. 2 shows the preferred system architecture of a client 20 or workstation 12. The computer system 100 typically comprises a central processor 102, a main memory 104, for example, RAM and an input/output controller 106. The computer system 100 also comprises peripherals such as a keyboard 108, a pointing device 110 for example a mouse, track ball or touch pad, a display or screen device 112, a mass storage memory 114, for example, a hard disk, floppy disk or optical disc, and an output device 116, for example, a printer.

The system 100 could also include a network interface card or controller 118 and/or a modem 120. The individual components of the system 100 could communicate through a system bus 122.

Figure 3:
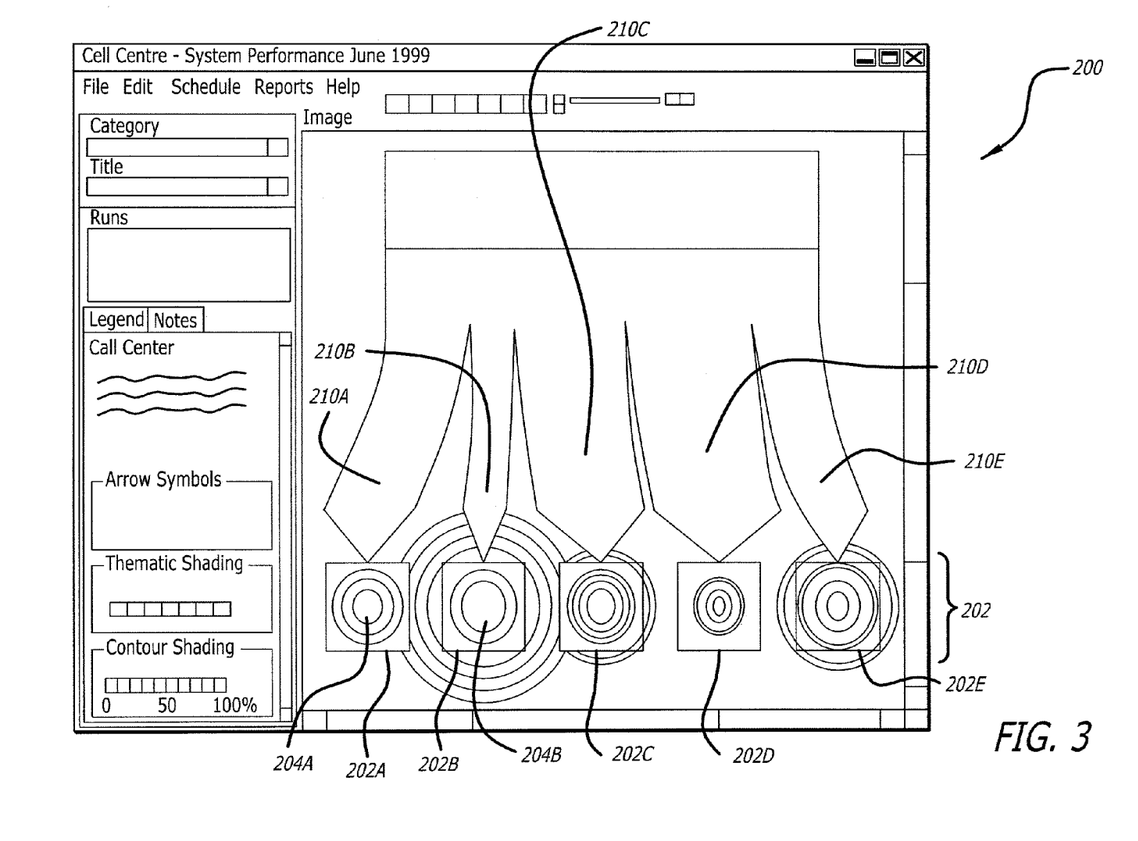
FIG. 3 is a preferred representation generated in accordance with the invention.

FIG. 3 illustrates at 200 one example of a display generated by the system where the merchant operates a call centre. In this example, a graphical representation of the merchant is generated and displayed. The graphical representation could include a representation of individual call centres 202 operated by the merchant or individual operators 202 forming part of the merchant organisation, for example 202A, 202B, 202C, 202D, and 202E. It will be appreciated that the particular representation generated will be varied according to the nature of the data represented, as will be described below.

The representation 200 is arranged to display the average time a caller spends in each interaction, or the average duration of each interaction. This key performance indicator, or KPI, is preferably graphically represented either centred on, adjacent, or near to the representation of individual call centres 202. There are a finite number of call centres operated by the merchant, and the individual average service times for each call centre represent a finite set of data values. These data values are graphically illustrated as data points in the representation 100. For example, the data value of call centre 202A is graphically illustrated as data point 204A, and the data value for call centre 202B is graphically illustrated as data point 204B.

The preferred representation 200 is colour-coded, and the average duration of interactions involving each call centre is illustrated by representing the corresponding data points in the appropriate colour to represent the correct average service time for each call centre.

The areas of the representation 200 around each data point are shown as a series of contour lines. The nature of the contours for each data point are preferably represented to gradually drop off or fan away from each data point. Each data point could be represented by x and y co-ordinates indicating the relative position of each data point in the representation. Each data point could also have a z value representing the height or magnitude of the data point. This z value could indicate, for example, the duration or data value at a particular data point. The contour lines represent z data values which are less than the data value of the data point around which the contour lines are displayed. In this way, each data value is centred on a data point. Each data point is displayed as a local maximum, as surrounding values drop off or fall away around each point.

In some circumstances, the z values will comprise a discrete set, with each of the data values from the discrete set represented as a contour line. Alternatively, where the data values form part of a continuum, then it is envisaged that the data values be grouped into a discrete number of data sets. For example, where a z value represents a time value, the contour lines could represent time values between 0 and 20 seconds, 20 seconds and 40, 40 seconds and 60 seconds, and so on, up to a discrete number of data sets.

This contoured method of representing data values is more particularly described in our patent specification WO 00/77862 to Compudigm International Limited filed on 14 Jun. 2000 entitled "Data Visualisation System and Method" which is incorporated by reference.

Figure 4:
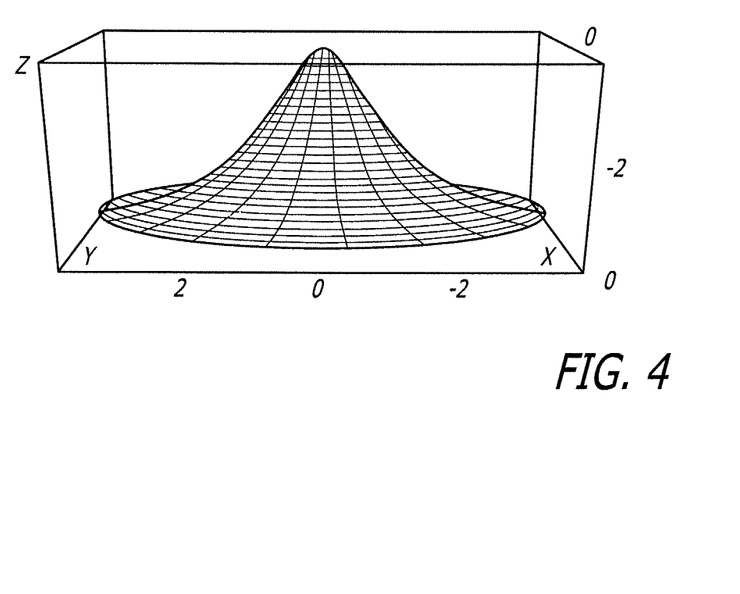
FIG. 4 is one view of a data point from the representation of FIG. 3.

FIG. 4 illustrates a typical data point, for example data point 204A. The data value of each data point represents the apex of a bell-shaped curve. As x and y values in the representation 200 are increased or decreased, the z value at the new position in the representation will change.

Figure 5:
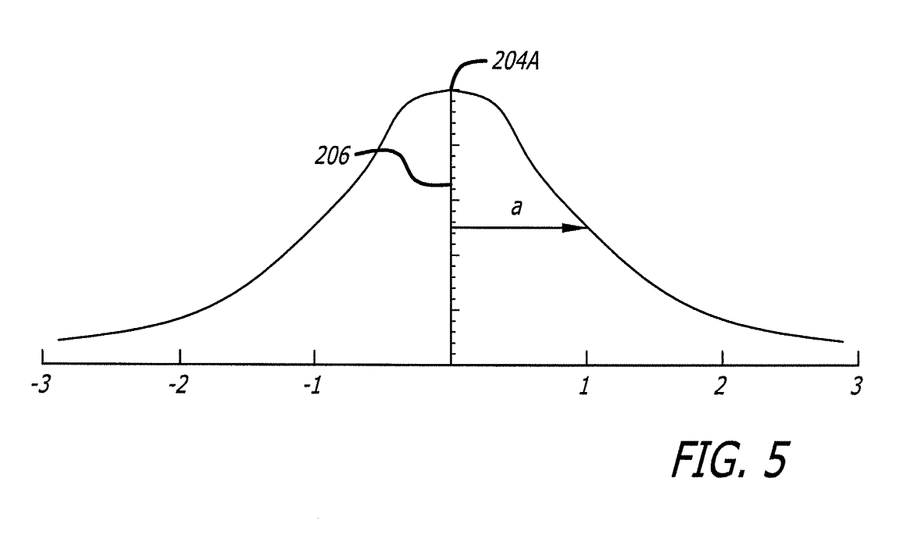
FIG. 5 is a further view of the data point of FIG. 4.

Referring to FIG. 5, data point 204A has an axis 206 and a maximum value at that axis. At a distance r from the axis 206, the drop in z value is preferably calculated by the following drop-off function.

$$f(r) = \frac{1}{1 + (r/a)^p} \quad (1)$$

The value of p is preferably 2 or 3. As the value of p is increased, the data point is represented having a steeper shoulder and a flatter peak with steeper walls.

The value of a defines the horizontal distance between the axis 206 and the point of maximum drop-off the resulting curve, which in practice defines the width of the contoured "hill". The value of a could be, for example, the point of "half height" of the value. Small values of a will result in fuse detail in a contoured representation and larger values of a will result in a less detailed representation.

Figure 6:
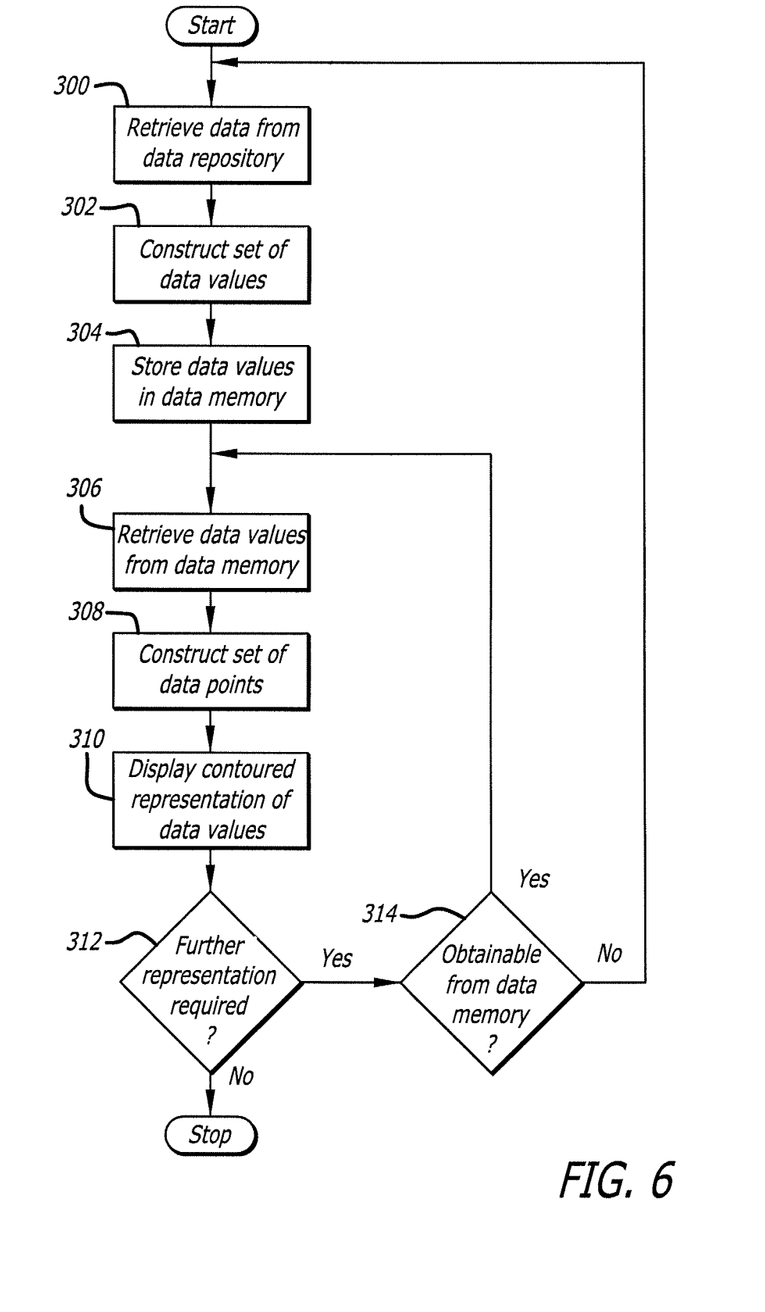
FIG. 6 is a flowchart of a preferred form of the invention.

FIG. 6 illustrates the preferred method of operation of the invention. As shown at 300, data is retrieved from the data repository 40 using a suitable query. The retrieved data could include data representing interactions between customers and merchants, where this data is stored in the data repository 40. The retrieved data could include the average service time per caller for each call centre.

As shown at 302, a set of data values is constructed from the retrieved data. This set of data values could include for example average service time per caller over a certain period for each call centre.

It is envisaged that the set of data values could be stored in data memory 90 to increase efficiency of the system as indicated at 304, which could comprise volatile main RAM or non-volatile mass storage of the workstation on which the invention 12 is implemented. Referring to step 306, the set of data values are retrieved from the volatile or non-volatile data memory and as shown at 308, a set of data points is constructed to represent the data values. Appropriate x and y values are generated for each data point to space the data points over a generated representation.

Referring to step 310, a contoured representation of the data values is generated and displayed on a client workstation 20. The individual drop-off for each data point is calculated and displayed in the appropriate colour and shading corresponding to the z value at each point.

It is envisaged that the invention generate individual displays of contoured representations. It is also envisaged that the invention generate animated sequences of representations by generating two or more "still" representations at various time intervals and superimposing successive representations over earlier representations to generate an animated sequence.

As indicated at 312, where such an animated sequence is required, further representations will be needed and if the necessary data is obtainable from the data memory as indicated at 314, it is retrieved from the data memory as indicated at 306; otherwise further data is retrieved from the data repository at 300.

Each representation could show summary visualisations of caller patterns, caller source patterns, and call centre operational parameters. The summary images could be either animated sequences or stills. The invention could produce flash sequences, for example, one or more frames and typically fewer than six frames, in sequence that are displayed in forward or reverse order in real time in response to the manipulation of some device, for example, manipulation of pointing device 110. The summary representations could include contours, shaded thematics, labels and icons.

Referring back to FIG. 3, representation 200 could also show the distribution of customers over the five call centres 202 operated by the merchant Arrows 210A, 210B, 210C, 210D and 210E represent the number of callers calling each of call centres 202A, 202B, 202C, 202D and 202E respectively. The width of each arrow could be proportional to the number of callers calling each call centre. The combined width of each arrow 210 represents the total number of calls made to the merchant's call centres 202.

Figure 7:
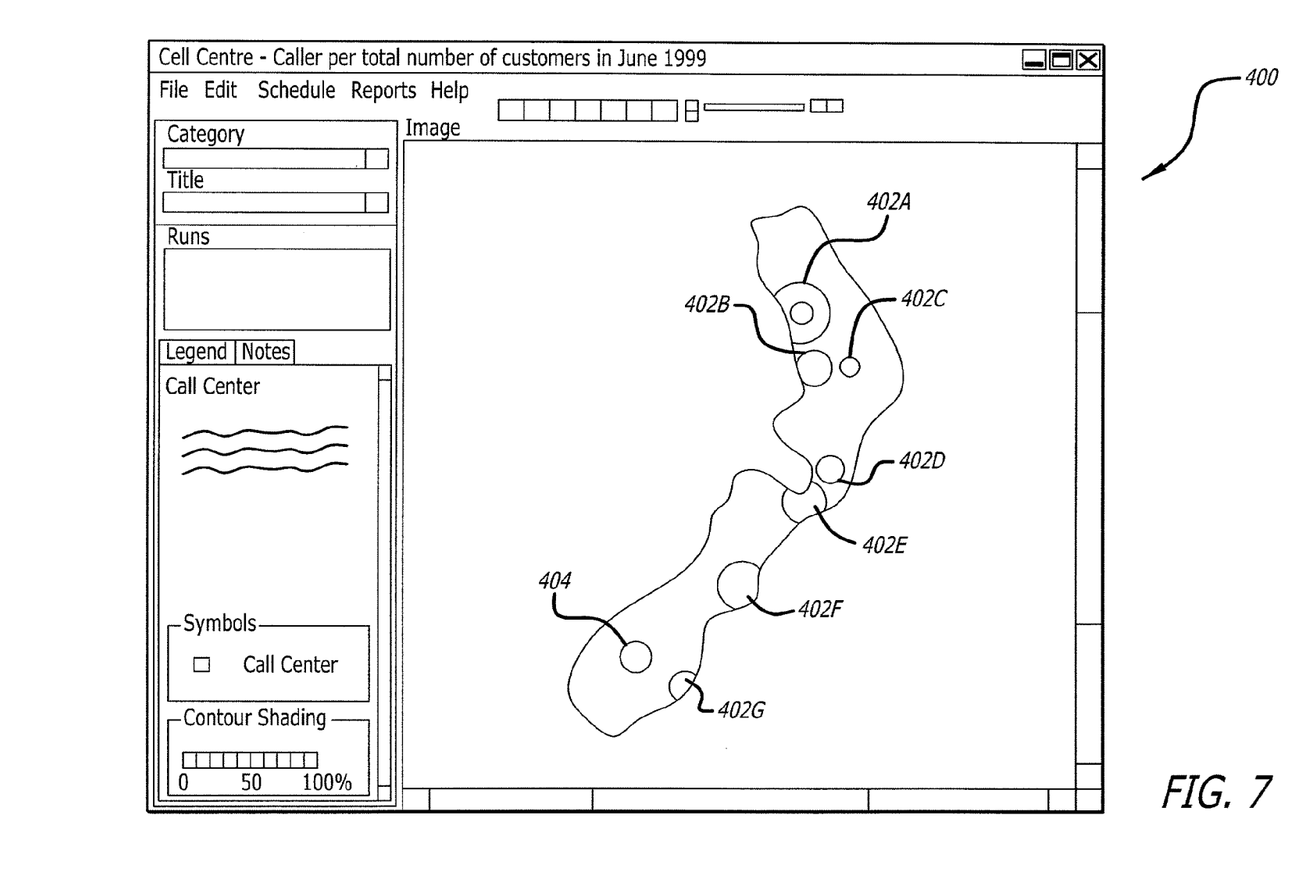
FIG. 7 shows a typical representation generated and displayed by the invention showing a customer provenance map.

FIG. 7 shows a further representation 400 showing customer provenance. The preferred customer provenance representation 400 displays a graphical spatial representation in the form of a topographical map. The map is arranged to show the origin of customers interacting with a particular merchant. It will be appreciated that the scale of the map could be altered, depending on the customer base under consideration. The map could show individual cities in a particular country such as that shown in FIG. 7. The map could alternatively include a detailed map showing suburbs in a particular city or could be a global map showing all countries.

The interaction data from which the representation is obtained could include a customer origin identifier. Alternatively, customer origin data could be stored in one or more further databases and indexed by customer identifier.

It is envisaged that a customer provenance representation could be generated for any merchant customer application to which the system is applied. For example, where the merchant operates a call centre, the system could generate a customer provenance representation showing the geographic area from which customers are calling the merchant. The customer provenance representation could be generated as an alternative to or in addition to the representation of the merchant.

Each interaction record generated by the merchant customer interaction could include a customer identifier. This customer identifier could be linked to a physical address, within the requirements of any privacy restrictions, provided to a merchant by a customer at the time of registration or log-on. Alternatively, a geographic location could be inferred from the interaction itself. For example, a customer using a public switched telephone network has an originating number in that network from which a geographic indicator could be extracted.

The preferred representation of data displays a particular value at a finite set of data points based on the representation, for example data points 402A, 402B, 402C, 402D, 402E, 402F and 402G. Each data point 402 preferably represents a call centre operated by the merchant. The value at each data point is preferably represented as a contoured representation, having a defined value centred on each data point with the values over the representation dropping away between data points. Data points with large values are presented as higher peaks than data points with lower values.

It will be appreciated that the representation could be filtered in a suitable manner. For example, representation 400 could show a contoured map of all incoming calls of two minutes duration or less, or calls of a particular nature for example first or second level IT support requirements. The invention could visualise data derived from or by any number of call centre geographic locations and inbound or outgoing calls, and calls that require data from multiple operators and/or call centres.

Figure 8:
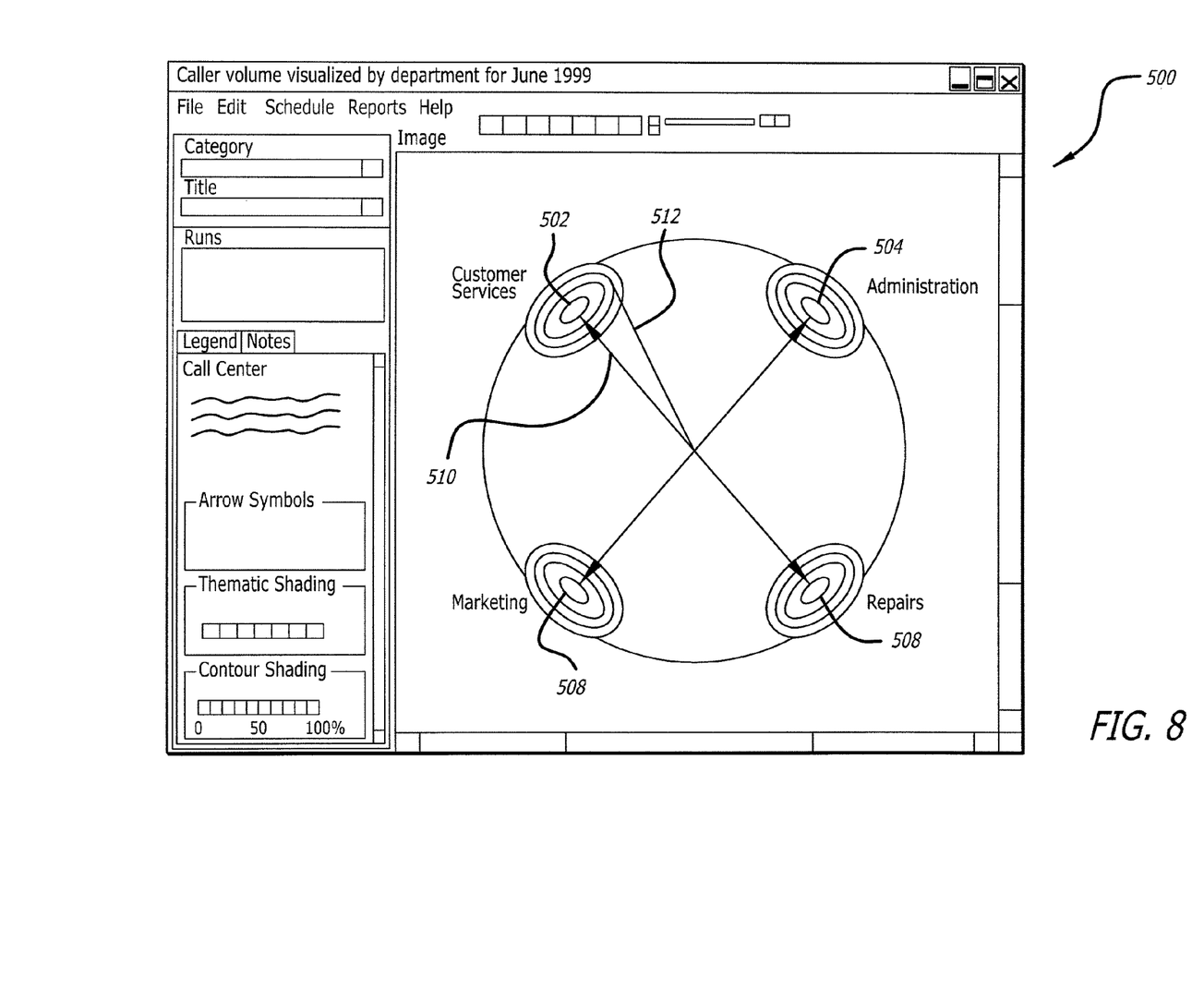
FIG. 8 is a further preferred form representation showing individual departments to which calls are directed.

Referring to FIG. 8, the invention could display a further representation 500 in which calls to each call centre or merchant are divided into individual departments, for example, customer services 502, administration 504, repairs 506 and marketing 508. As described above, each interaction data set could include a call type specifying the nature of the interaction. It will be appreciated that the representation 500 could represent an individual call centre or could represent the aggregate call centres of a merchant.

In FIG. 8, four contoured representations are displayed around a central globe. The contoured representations are centred on respective data points 502, 504, 506 and 508. The z value at each data point is represented as a local maximum in a similar manner to the contoured representations of FIG. 3 and FIG. 7. The z values are displayed as contour lines and are also represented to gradually drop off or fall away from each data point. In FIG. 8, the z value of (x, y) co-ordinates around data point 502 depends on the radius R of the sphere on which the contours are represented and the angle θ between notional line 510 connecting the centre of the sphere and data point 502 and notional line 512 connecting the centre of the spheres and the (x, y) point in question. A typical drop off function could be 5 where a and p are defined as above in equation (1):

$$f(\theta) = \frac{1}{1 + (R\theta/a)}p \quad (2)$$

Figure 9:
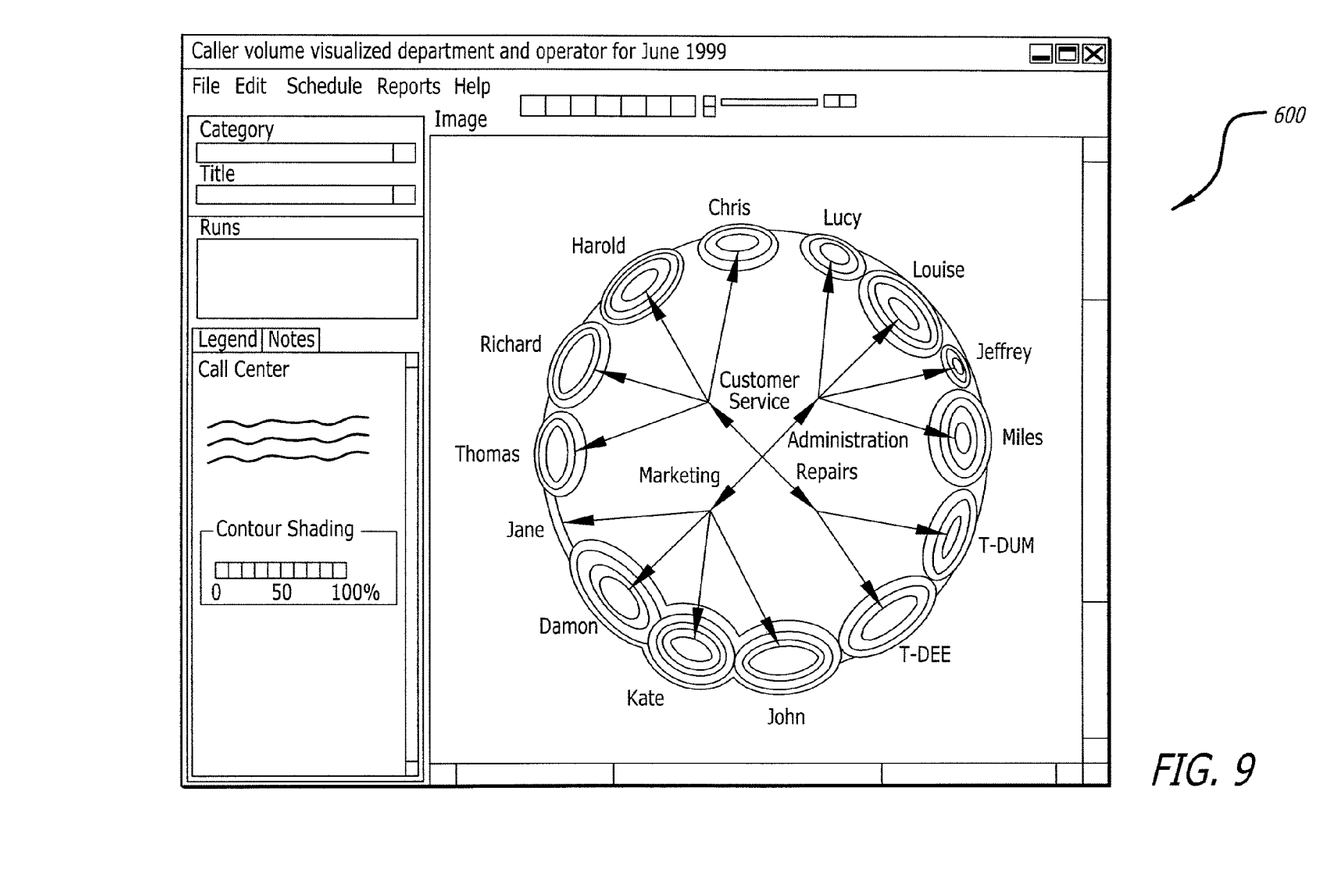
FIG. 9 is a further preferred form representation in which the representation of FIG. 8 is modified to show individuals within each department.

Referring to FIG. 9, representation 600 could show the staff from each department receiving the calls from each customer. This would enable the performance of each staff member to be evaluated.

Figure 10:
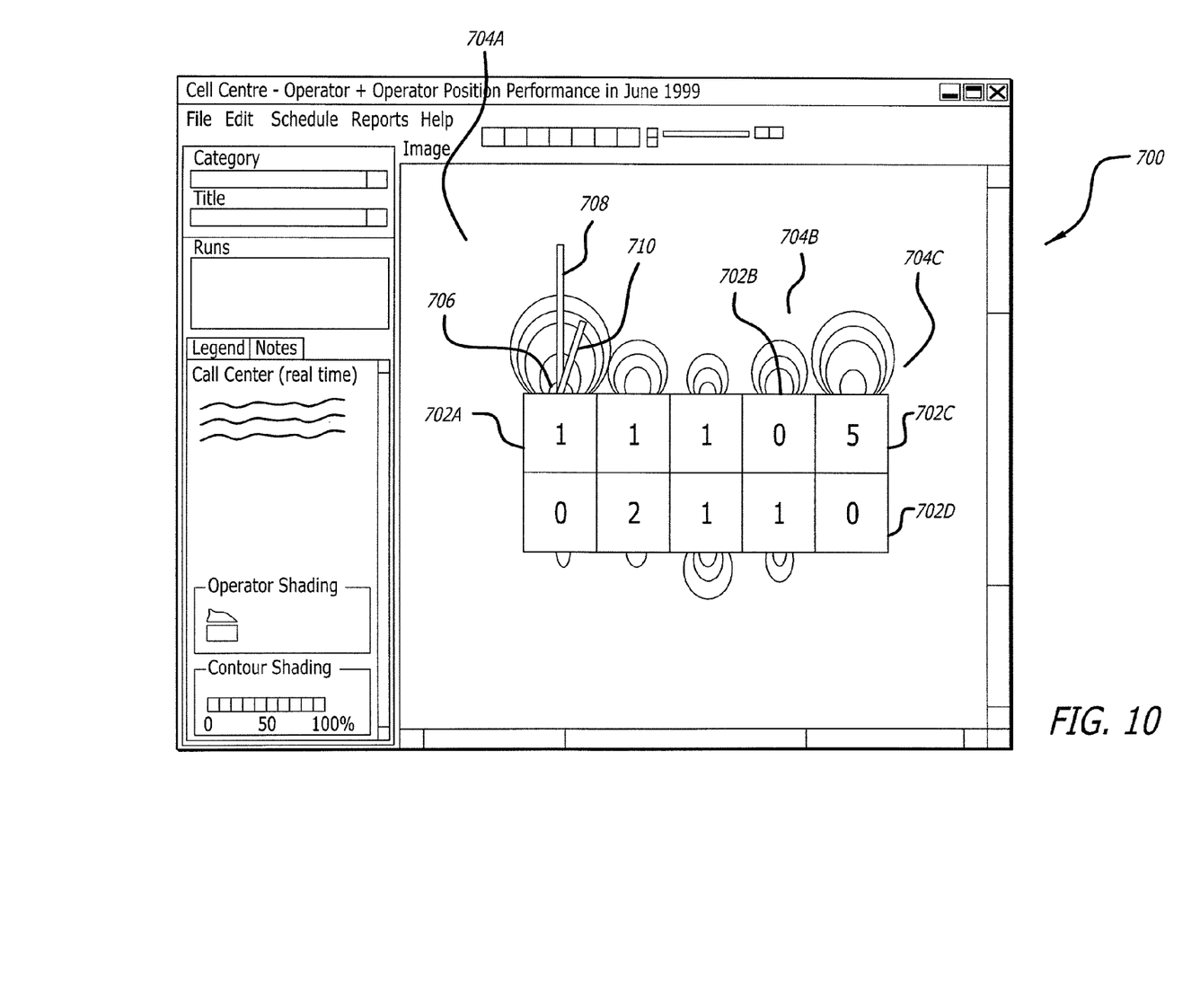
FIG. 10 shows a further real time representation of activity in a call centre.

FIG. 10 shows a further representation 700 which could include a real time representation of the activity in a call centre. Individual operators 700 for example 702A, 702B, 702C and 702D are shown graphically as boxes. Each box is preferably shown as having a different colour depending on the current activity of that operator. Operators 702A and 702B, for example, are preferably displayed in a dark red colour indicating that that operator is currently on a call which has exceeded a threshold time limit, for example five minutes. Operators currently engaged in an interaction which has not exceeded the five minute threshold are shown in white, for example 702C. Call centre operators who are currently not engaged in an interaction with a customer are preferably shown in grey, for example 702D.

The representation of each operator could be further supplemented with a numeric value which could show a running count of how many calls the operator has fielded within a predefined time period which have exceeded the threshold time limit per call. Operator 702A, for example, has fielded six calls which have exceeded the threshold, operator 702B has fielded two calls which have exceeded the threshold and operator 702C has fielded five calls which exceeded the threshold.

It is also envisaged that the average time per call for each operator could be shown as a contoured value, for example, 704A, 704B and 704C. It will be readily appreciated that operator 702A has the greatest average time for each interaction, operator 702C has the next greatest average time per interaction and operator 702B has the next greatest average time per interaction.

In a similar manner to the contour representations described above, the z value of each data point, for example data point 706, is represented as a local maximum, with (x, y) values around data point 706 gradually falling off or dropping away. To calculate individual z values, a notional, substantially perpendicular, line 708 is represented extending outwardly from data point 706 through the contoured representation. To calculate the z value of a point neighbouring data point 706, a notional line 710 is drawn from the (x, y) co-ordinate in question to the data point 706 and the angle (θ) between lines 708 and 710 calculated. The z value of the (x, y) co-ordinate could be calculated as follows, where a and p are defined as above in equation (1):

$$f(r, \theta) = \frac{1}{1 + (r/a\cos(\theta))}p \quad (3)$$

It will also be appreciated that the performance of call centres could depend on various operator characteristics, for example, experience, performance levels for example average calls processed per hour, and/or characteristics of the working environment, for example, the impact of operator location on the operator's average performance. For example, an operator located near a hallway may not perform as well as an operator not located near a hallway.

Figure 11:
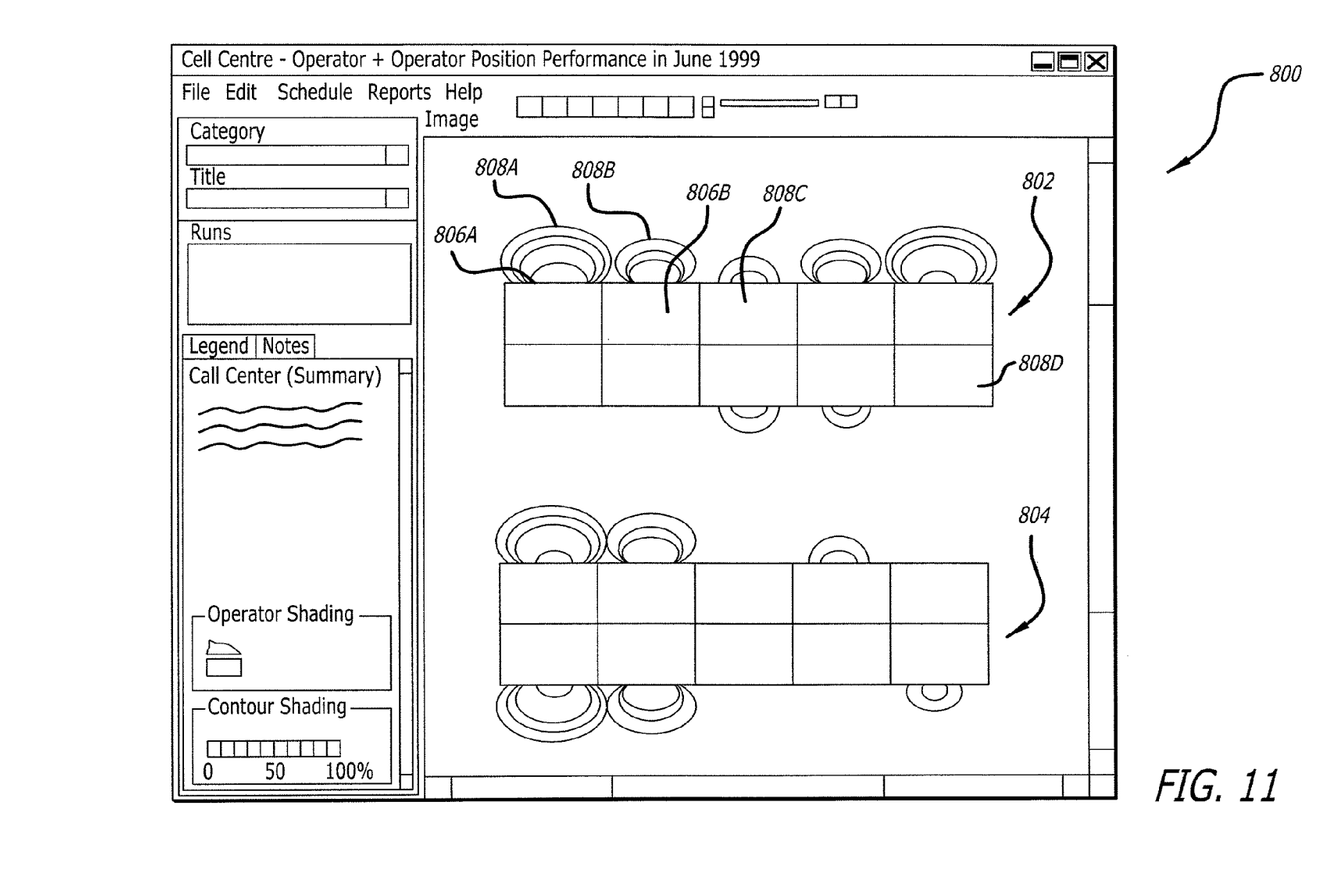
FIG. 11 is a representation showing the performance(s) of individual operators.

FIG. 11 shows a further preferred form representation 800 which indicates the performance of individual operators. It is envisaged that the invention will first calculate various characteristics of each operator, for example the average time for each interaction with a customer. Representation 800 shows two spatial representations of call centre operators organised into banks 802 and 804. Individual operators 806, for example 806A, 806B, 806C and 806D are shown in operator bank 802.

In some circumstances, an operator will not perform as well in one location than in another location. Operator 806A is shown displayed in red which indicates that the average time an operator spends on a customer interaction is greater when the operator is in the position shown in bank 802 than the overall average for that operator.

The invention may, for example, calculate the overall mean time an operator spends on calls and calculate the standard deviation of this average time. The operator is then measured when placed in the position shown in bank 802 and the mean time spent on calls calculated from this average. Where the new mean is significantly less, for example, two or three standard deviations from the overall mean, the invention could display the operator in a red colour.

On the other hand, where the particular location has a positive impact, for example, where the new mean is two or three standard deviations greater than the overall mean, the operator could be shown in blue, for example, 806B. Where there is no significant impact, the operator could be shown in grey, for example, 806C. In some circumstances, the operator could be inactive and be shown in white, for example, 806D.

The average call length for each operator could be shown as a contoured representation, for example, 808A, 808B and 808C.

The representation 800 could also usefully contrast the two teams 802 and 804 to measure performance of each team relative to the other.

Figure 12:
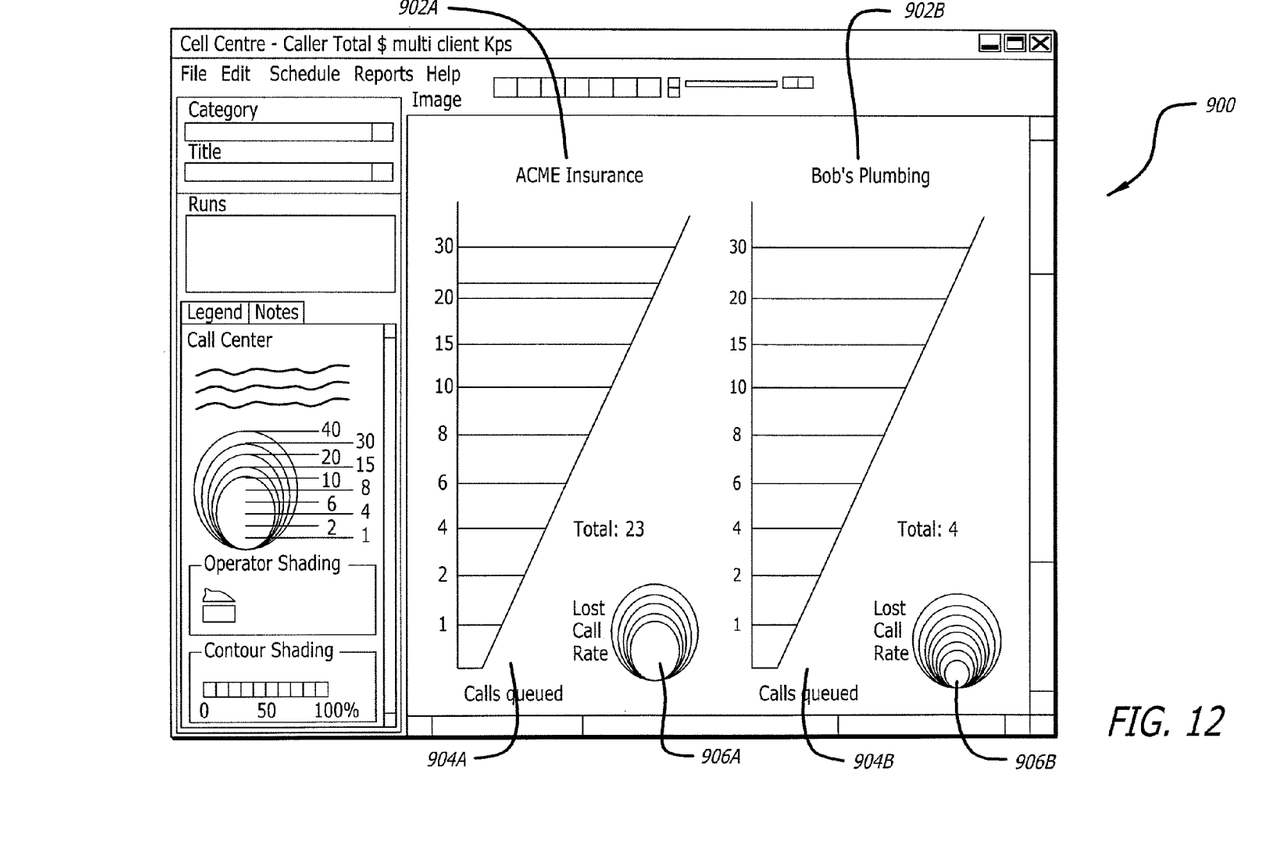
FIG. 12 show a representation in which the performance of different organisations is contrasted.

Referring to FIG. 12, a further preferred form representation 900 could contrast customer service for different organisations 902A and 902B. Each representation 902 could show the number of calls queued for each organisation. The representation could also show the lost call rate for each organisation, for example 906A and 906B. It will be appreciated that representation 900 could show any number of key performance indicators in addition to or as an alternative to the number of queued calls and the lost call rate.

It can be readily perceived from representation 900 that organisation 902A has a high number of queued callers and a high drop-out rate and will require further call centre operators. Organisation 902B on the other hand has a smaller number of calls queued and has a lower drop-off rate so major reorganisation is not necessary.

The invention has the effect that merchants and other organisations do not need to follow the traditional approach of forming a hypothesis in advance and then verifying the hypothesis, although the representations generated by the system may be useful for verifying a particular hypothesis. The system presents data in an easily interpreted and intuitive manner which may be useful in identifying unexpected trends in the data.

The foregoing describes the invention including preferred forms thereof. Alterations and modifications as will be obvious to those skilled in the art are intended to be incorporated within the scope hereof, as defined by the accompanying claims.

What is claimed:

1. A data visualization system comprising:
   an interaction database maintained in a computer memory of interaction data representing interactions between customers and at least one merchant;
   a retrieval component configured to retrieve from the interaction database data representing interactions between customers and the merchant, and to construct a finite set of data values from the retrieved data;
   a display component configured to display a graphical representation of a merchant and a graphical representation of each of the set of data values centered on respective data points disposed on a representation of a bell-shaped curve; and
   a contour generator configured to generate and display one or more contour lines at least partly around each data point to form a bell-shaped curve, in which the areas of representation around each data point are shown in a series of contour lines, and the nature of the contour lines for each data point are preferably represented to gradually drop off or fan away from each data point, wherein each data point is displayed as a local maximum at an apex of the bell-shaped curve.

2. The system of claim 1, wherein the representation is color-coded.

3. The system of claim 1, wherein each data point has a "z" value representing a height or magnitude of the data point.

4. The system of claim 3, wherein the contour lines represent "z" data values which are less than the data value of the data point around which the contour lines are displayed.

5. The system of claim 3, wherein a drop-off for each data point is calculated and displayed in a color and shading that corresponds to the "z" value at each point.

6. A data visualization system comprising:
   an interaction database maintained in a computer memory of interaction data representing interactions between customers and at least one merchant;
   a retrieval component configured to retrieve from the interaction database data representing interactions between customers and the merchant, and to construct a finite set of data values from the retrieved data;
   a display component configured to display a graphical representation of a merchant and a graphical representation of each of the set of data values centered on respective data points disposed on a representation of a paraboloid; and
   a contour generator configured to generate and display one or more contour lines at least partly around each data point to form a paraboloid, in which the areas of representation around each data point are shown in a series of contour lines, and the nature of the contour lines for each data point are preferably represented to gradually drop off or fan away from each data point, wherein each data point is displayed as a local maximum at an apex of the paraboloid.

7. The system of claim 5, wherein the representation is color-coded.

8. The system of claim 5, wherein each data point has a z value representing a height or magnitude of the data point.

9. The system of claim 7, wherein the contour lines represent "z" data values which are less than the data value of the data point around which the contour lines are displayed.

10. A data visualization system comprising:
    an interaction database maintained in a computer memory of interaction data representing interactions between customers and at least one merchant;
    a retrieval component configured to retrieve from the interaction database data representing interactions between customers and the merchant, and to construct a finite set of data values from the retrieved data;
    a display component configured to display a graphical representation of a merchant and a graphical representation of each of the set of data values centered on respective data points disposed on a representation of a contoured hill; and
    a contour generator configured to generate and display one or more contour lines at least partly around each data point to form a contoured hill, in which the areas of representation around each data point are shown in a series of contour lines, and the nature of the contour lines for each data point are preferably represented to gradually drop off or fan away from each data point, wherein each data point is displayed as a local maximum at an apex of the contoured hill;
    wherein the contour generator generates animated sequences of representations by generating two or more still representations at different time intervals and superimposing successive representations over earlier representations to generate an animated sequence.

11. The system of claim 10, wherein the representations define graphical spatial representations in the form of a topographical map.

12. The system of claim 11, wherein the map shows individual cities in a particular country.

13. The system of claim 10, wherein the representations display customer provenance.

* * * * *